US007231482B2

(12) United States Patent
Leach

(10) Patent No.: US 7,231,482 B2
(45) Date of Patent: *Jun. 12, 2007

(54) METHOD AND SYSTEM FOR MONITORING AND TRANSMITTING UTILITY STATUS VIA UNIVERSAL COMMUNICATIONS INTERFACE

(75) Inventor: Mark Leach, Lizella, GA (US)

(73) Assignee: Universal Smart Technologies, LLC., Murrells Inlet, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/245,796

(22) Filed: Oct. 7, 2005

(65) Prior Publication Data

US 2006/0036795 A1 Feb. 16, 2006

Related U.S. Application Data

(63) Continuation of application No. 09/591,258, filed on Jun. 9, 2000, now Pat. No. 6,954,814.

(51) Int. Cl.
  *G06F 13/14* (2006.01)
  *H04M 11/00* (2006.01)
  *G08C 15/06* (2006.01)
(52) U.S. Cl. ............ 710/305; 379/106.03; 340/870.02
(58) Field of Classification Search ................ 710/305; 340/870.02; 709/208, 219; 324/142; 379/106.06
  See application file for complete search history.

(56) References Cited

U.S. PATENT DOCUMENTS 5,179,660 A * 1/1993 Devany et al. ............. 709/219
5,541,589 A    7/1996 Delaney
5,590,179 A * 12/1996 Shincovich et al. ... 379/106.06
5,897,607 A    4/1999 Jenney et al.

(Continued)

FOREIGN PATENT DOCUMENTS

JP    2003256969    12/2003

*Primary Examiner*—Christopher E. Lee
(74) *Attorney, Agent, or Firm*—Sutherland Asbill & Brennan LLP

(57) ABSTRACT

A method and system for monitoring utility meter status, and transmitting a status message via an output device connected to a universal communications interface in the event that the utility meter status meets a predetermined condition. Typically, the predetermined condition is a power loss, signified by a drop in voltage or current. The system is connected to a utility meter, such as an electric meter. The voltage level of the electric meter is monitored through a voltage input interface. An analog-to-digital converter transforms the voltage waveform into a series of digital is data packets, which are then transmitted to a microprocessor. The microprocessor monitors the digital signal for a power loss indication, or other predetermined condition. Once a predetermined condition is met, the microprocessor transmits a status message across a universal serial bus to a universal communications interface. The universal communications interface is connected to at least one slot, which contains at least one output device. The universal communications interface is further able to determine the proper signal format employed by the output device for information transmission. Upon receipt of the status message, the universal communications interface converts the status message to the signal format employed by the output device, and passes the converted status message to the output device via the slot. The output device may then transmit the status message to a remote receiver in order to quickly and accurately update distant locations regarding the utility meter.

16 Claims, 2 Drawing Sheets

U.S. PATENT DOCUMENTS

| | | | |
|---|---|---|---|
| 5,898,387 A * | 4/1999 | Davis et al. | 340/870.02 |
| 5,940,009 A * | 8/1999 | Loy et al. | 340/870.02 |
| 5,994,892 A * | 11/1999 | Turino et al. | 324/142 |
| 6,016,432 A | 1/2000 | Stein | |
| 6,124,806 A | 9/2000 | Cunningham et al. | |
| 6,240,107 B1 | 5/2001 | Glass et al. | |
| 6,601,124 B1 | 7/2003 | Blair | |
| 6,671,636 B2 | 12/2003 | Dawson | |
| 6,784,806 B1 | 8/2004 | Lee, Jr. et al. | |
| 6,891,838 B1 | 5/2005 | Petite et al. | |
| 6,954,814 B1 * | 10/2005 | Leach | 710/305 |
| 7,043,532 B1 * | 5/2006 | Humpleman et al. | 709/208 |
| 2002/0180615 A1 | 12/2002 | Kim et al. | |
| 2004/0024483 A1 | 2/2004 | Holcombe | |
| 2004/0113810 A1 | 6/2004 | Mason et al. | |
| 2005/0035877 A1 | 2/2005 | Kim | |

* cited by examiner

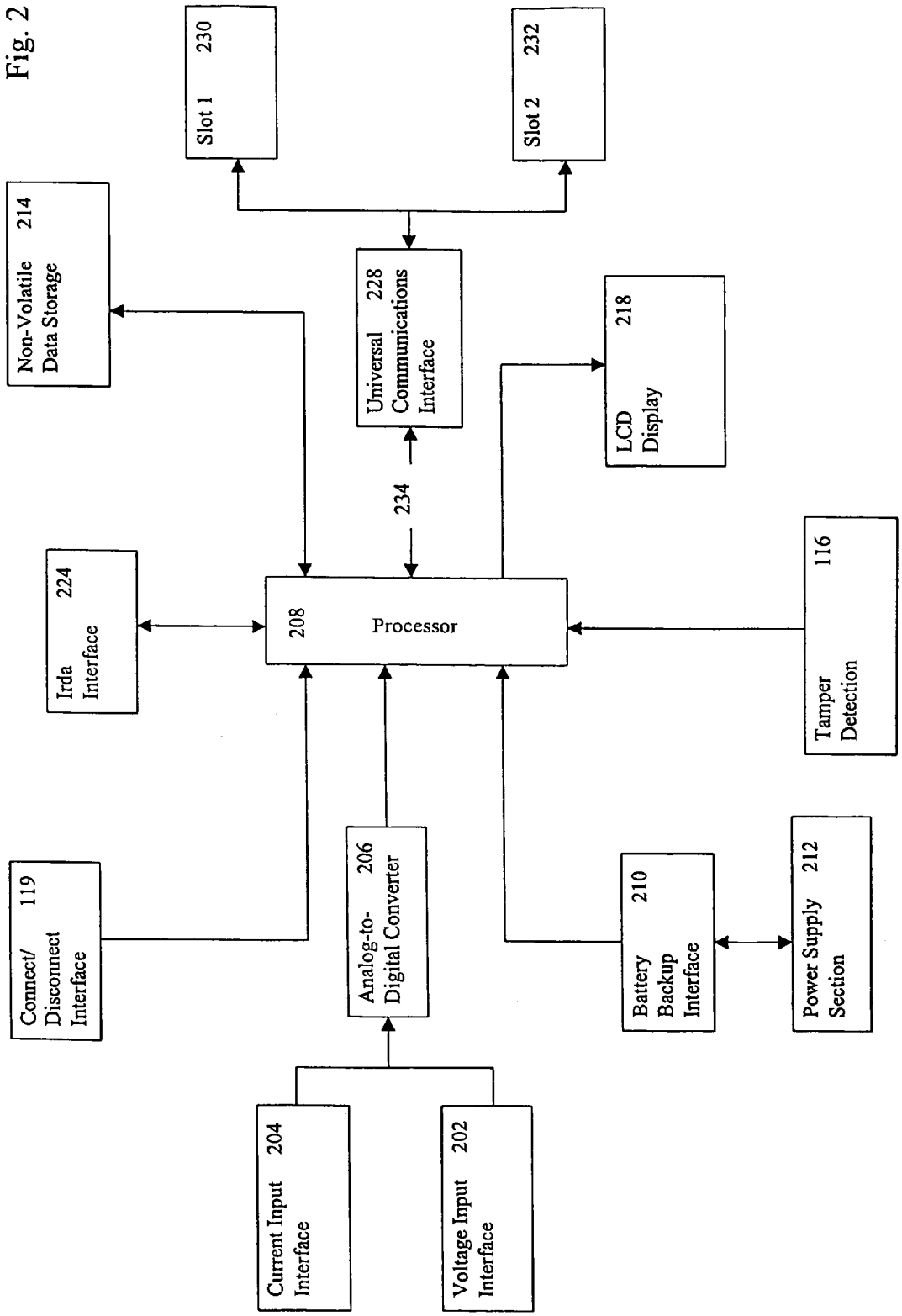

METHOD AND SYSTEM FOR MONITORING AND TRANSMITTING UTILITY STATUS VIA UNIVERSAL COMMUNICATIONS INTERFACE

RELATED APPLICATION DATA

This application is a continuation of U.S. patent application Ser. No. 09/591,258, filed on Jun. 9, 2000, to be issued as U.S. Pat. No. 6,954,814 on Oct. 11, 2005, the contents of which is hereby incorporated by reference in its entirety.

TECHNICAL FIELD

The present invention relates generally to automated meter reading. More particularly, the present invention relates to an automated meter for collecting data and communicating with a remote site.

BACKGROUND OF THE INVENTION

Automated meter reading (AMR) devices are often configured to transmit data relating to utility usage parameters to a remote location, such as a utility company. An AMR device may be a retro-fit device or a solid-state device. A retro-fit AMR device attaches to an existing utility meter and includes functionality to read the existing utility meter, transform the meter reading into usable data and transmit the data to a remote location. Solid-state AMR devices are designed to replace the existing utility meter and are attached directly to the utility line to measure utility usage data.

A significant drawback of prior art AMR devices is that they are functionally limited in their communications options and are thus not generally adaptable to evolving communications technology. AMR devices are typically constructed with hardware and/or software components for transmitting and receiving AMR data over a single communications medium. Some prior AMR devices may be equipped with components for transmitting and receiving AMR data over a finite number of communications media. However, as communications technology advances and new and different communications mediums are selected for the transmission of AMR data, incompatible AMR devices must be replaced at great expense to the utility companies. Unfortunately, the cost of replacing incompatible AMR devices is often passed on to the consumer.

Therefore, there remains a need in the art for an AMR device that is able to adapt to evolving communications technology by being operable to transmit and receive AMR data via any communications medium.

SUMMARY OF THE INVENTION

Generally stated, the present invention is directed to a method and system for providing notification of utility status to a remote location. Typically, this notification takes the form of a meter reading message, including such information as power outage, low voltage, or the current meter reading. The present invention provides a device for transmitting status information to a utility or other end user regarding the current status of a utility meter. An exemplary embodiment of the present invention may be recognized as a system including at least one input, a microprocessor, a universal bus, a universal serial port, and at least one communications slot.

The system is attached (either physically or via a remote connection) to the utility meter, from which an input signal is received. The system is additionally connected to an output device, such as a radio frequency transmitter, a modem, a coaxial cable, and so on. These output devices communicate with a system microprocessor through the use of a universal communications interface and a universal bus. The universal communications interface is connected to one or more slots, which are operative to accept various forms of output devices. The universal communications interface is equipped with "plug and play" technology, so that the interface may recognize a connected output device and relay signals between the microprocessor and output device in the proper data format.

Generally, the system transmits a status message containing the current meter reading and/or any trouble condition via the connected output device to a receiver, so that the status of the monitored utility may be instantly known at a remote location. Specifically, the microprocessor monitors the input signal for a trouble condition. A "trouble condition" is typically defined as a specific value which the input signal must not exceed or fall below. In the event that the trouble condition is reached, the microprocessor transmits a status message of a type in accordance with its programming. The microprocessor sends the status message across the universal bus to the universal communications interface, which in turn modifies the data format of the status message such that an output device connected to the slot may accept and relay the message.

That the invention improves over the drawbacks of prior document classification systems and accomplishes the advantages described above will become apparent from the following detailed description of the embodiments and the appended drawings and claims.

BRIEF DESCRIPTION OF THE DRAWINGS

FIG. 2 is a functional block diagram of an exemplary automated meter reading system in accordance with an exemplary embodiment of the present invention.

DETAILED DESCRIPTION OF THE EXEMPLARY EMBODIMENT

Figure 1:
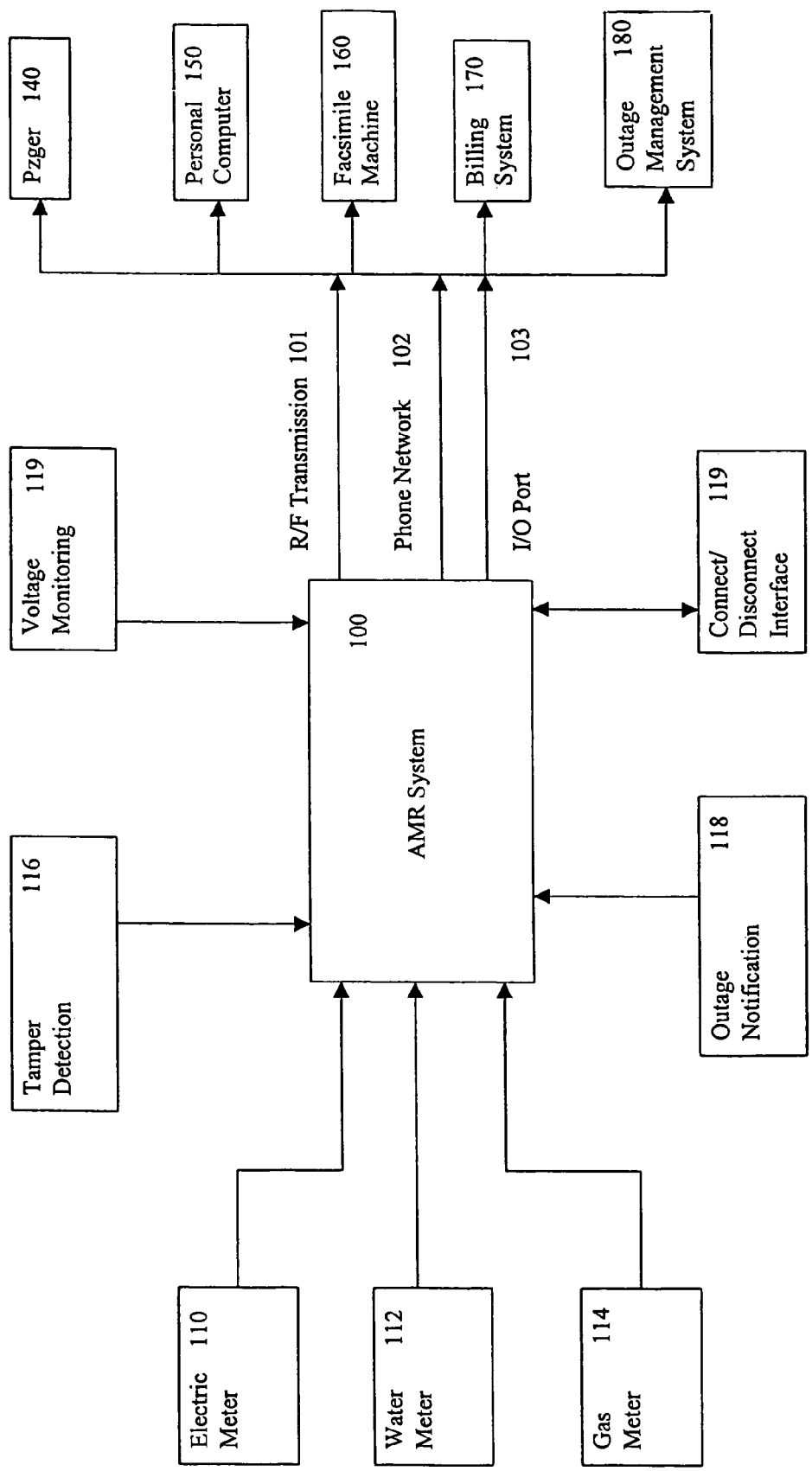
FIG. 1 is a signal flow block diagram displaying field use of an exemplary automated meter reading system in accordance with an exemplary embodiment of the present invention.

The exemplary embodiment relates to a system for automated meter reading (AMR). The AMR system 100 of the present invention is equipped with a universal communications bus coupled to a universal communications port, which allows the device to operate with interchangeable communications devices. The AMR system 100 is also equipped with "plug and play" technology, so that the AMR system 100 is able to recognize and communicate with a variety of communications devices that may be plugged into its universal communications port. Accordingly, with proper configuration, an appropriate communications device may be plugged into the AMR system 100 to enable the transmission and reception of AMR data over any given type of communications medium. Of course, the communications medium selected by the utility company for AMR transmission and reception dictates the type of communications device that must be plugged into the AMR system 100.

The following description of exemplary embodiments of the present invention will refer to the drawing, in which like numerals indicate like parts throughout the several figures.

The exemplary embodiments will be discussed with particular reference to an AMR system 100 adapted for power. However, it should be kept in mind that the present invention may also be adapted for other types of utilities, such as water and gas.

FIG. 1 displays a signal diagram of an exemplary AMR system 100 in accordance with the present invention. As shown, the exemplary AMR system may accept data inputs from multiple sources, and send data through multiple output connections in a variety of data formats. FIG. 1 is intended only to show a possible use of the exemplary embodiment, and accordingly the figure and following text should be regarded as an illustration rather than limitation of use.

The AMR system 100 may be connected to a variety of meters, such as an electric meter 110, water meter 120, gas meter 130, and so on. One AMR system may be used to monitor multiple meters, or each meter may have a dedicated system connected. Further, the AMR system 100 may accept additional signals from utilities such as a tamper detection monitor 116, a voltage monitor 117, an outage notification monitor 118, or a reconnect/disconnect monitor 119. Alternately, the AMR system may have built-in functionality to monitor these events.

The AMR system 100 receives input data from the monitored meters in a variety of formats. Typically, the data takes the form of a voltage or current level present in a given meter, although alternate embodiments may accept radio frequency (R/F) data, pressure level, temperature, and so on. When this input signal reaches a certain threshold for a specific period of time, the AMR system 100 transmits a notification signal via a connected output device to a receiving device.

Sample output transmissions include a R/F transmission 101, a DTMF signal sent across a telephone network 102, or a data signal transmitted through a computer I/O port 103, such as a serial, parallel, or USB port. The AMR system may be programmed to transmit on one or more connected devices in one or more signal formats. Exemplary receiving devices include a pager 140, a personal computer 150, a facsimile machine 160, a utility billing system 170, or an outage management system 180. For example, a single AMR system 100 may transmit a first signal across the telephone network 102 to a pager 140, notifying a technician of a power outage at the monitored electric meter 110. Simultaneously, the system may send a R/F transmission 101 to a billing system 170, notifying the billing system to temporarily suspend billing a customer's account until such time as the electric meter is repaired.

FIG. 2 shows a block diagram of an exemplary AMR system 100 in accordance with the present invention. As shown, the exemplary AMR system 100 includes a voltage input interface 202 and a current input interface 204. Voltage and current are received from a power line (not shown). As should be apparent to those of skill in the art, the input interfaces may be adapted for input from a single phase or three-phase power source. The voltage input interface 202 and current input interface 204 are coupled to an analog-to-digital conversion device 206, such as an RMS converter. Digital signals representing the converted voltage and current are then fed to the processor 208, where the utility usage readings are measured and processed in a conventional manner.

The processor 208 is controlled by firmware stored in the non-volatile data storage 214. Non-volatile storage 214 may include RAM and/or ROM and may be scalable in capacity. RAM may be programmable and re-programmable, so that operational parameters of the AMR system 100 may be changed. The non-volatile storage 214 may be re-programmed remotely through a communications device. Alternatively, non-volatile storage 214 may be re-programmed locally through an IRDA interface 224, or the like. As shown, the AMR system 100 may include additional components, such as: a reconnect/disconnect interface 119 for enabling re-connect and disconnect of utility services; a tamper detection device 116 operable to detect physical tampering with the AMR system 100; a power supply 212 and a battery back-up interface 210. Other components not shown may include an outage notification interface, a voltage monitoring interface and a temperature monitoring interface. Still other components will occur to those of ordinary skill in the art.

The AMR system 100 is equipped with a universal communications interface 228, which allows the system to communicate via any medium, such as: R/F, telephone, cable, fiber optics, satellite, power line carriers, etc. The universal communications interface 228 sends and receives data to and from a communications device (not shown), via ports or slots 230 and 232. Slot 1 230 and slot 2 232 each provide inputs and outputs for coupling with communications devices (not shown). Communications devices may be coupled to the slots 230 and 232 in any well known manner, such as through use of a circuit board or "card", a multi-prong connector (either male or female), a coaxial jack, or other manners apparent to those skilled in the art. Additional slots may be included for coupling additional communications devices to the universal communication interface 228. The universal communications interface 228 also sends and receives data to and from the processor 108 via a universal bus 234.

In a preferred embodiment, the universal bus 234 comprises a 4-bit parallel bus. By using a 4-bit parallel bus, the AMR system 100 may transfer up to four bits of information simultaneously from the universal communications interface 218 to the processor 208, and vice-versa. This permits data from a single source to be rapidly transmitted to and from the processor. Further, the bus 234 may multiplex data transmissions originating from or sent to multiple sources. That is, rather than transmitting a single data bit from a single source interfaced with slot 1 230, then transmitting the next data bit from a second source interfaced with slot 2 232, the bus may simultaneously transmit data to or from up to four devices connected to the universal communications interface 218. For example, a R/F transmitter sending data to a remote location may be connected to slot 1 230, a transmitter operative to notify a pager upon voltage loss may be connected to slot 2 232, another transmitter operative to call a cell phone and play a prerecorded message upon tamper detection may be connected to a third slot, and so on. The universal bus 234 permits the processor 208 to send multiple bits simultaneously to a single device, thus speeding data transmission rates, or to communicate with several devices simultaneously, thus allowing signal multiplexing.

In alternate embodiments, the universal bus 234 may be an 8-bit bus, 16-bit bus, or bus of any other size without departing from the spirit and scope of the present invention.

Due to the fact that data generated internal to the AMR system 100 (i.e., the processor 208) will be digital and data generated external to the AMR system 100 may be analog, the universal communications interface 228 may comprise analog-to-digital and digital-to-analog converters. The universal communications interface 228 may also comprise such components as a clock, shift registers, multiplexers, and the like for facilitating the transfer of data between the processor and various types of communications devices. The universal communications interface 228 may include its own processor and non-volatile storage or may be controlled by the processor 108 and utilize the non-volatile storage 214 of the AMR device. Plug-and-play software or firmware may be stored in a non-volatile storage for enabling the universal communications interface 228 to recognize a communications device that is plugged into a slot 230 and 232. As mentioned, a non-volatile storage may be easily re-programmed for updating or adding plug-and-play software or firmware as needed.

Accordingly, the AMR system 100 of the present invention has the ability to send and receive data in ASCII code, DTMF signals, or any other type of signal or data transfer protocol. As an example of the advantages of the universal communications capabilities of the present invention, the AMR system 100 may transfer digital data directly to a digital computer, a fax machine, alphanumeric display cell phone, or a pager of a utility company without the need for a DTMF-to-ASCII converter at the utility company.

An exemplary embodiment of the present invention may be configured to individually or simultaneously read power, water and/or gas meters. When configured to read several meters simultaneously, an exemplary AMR system 100 is positioned at a central meter and additional remote circuitry is placed at one or more remote meters. The remote circuitry is programmed to collect data from a remote meter and to send the data to the AMR system 100 via a communications device, such as an R/F modem. Data is then processed and transmitted from the AMR system 100 to a utility company via the universal communications interface 228.

Alternate embodiments of the present invention will become apparent to those having ordinary skill in the art to which the present invention pertains. Such alternate embodiments are considered to be encompassed within the spirit and scope of the present invention.

CONCLUSION

The AMR system 100 may include additional functionality not herein specifically described. For example, the system may accept to transmit signals in data formats other than those explicitly specified. The AMR system 100 may also have more or less communications slots than enumerated, or may have a universal bus 234 of a size other than four bits. Many other modifications and additional features will become evident in view of the preceding description of the embodiments of the invention. It should be understood, therefore, that the foregoing relates only to certain embodiments of the invention, and that numerous changes may be made therein without departing from the spirit and scope of the invention as defined by the following claims.

I claim:

1. A system for monitoring a utility status, comprising:
   a universal communications interface configurable for communicating with a plurality of different types of communication devices, each communication device operative to communicate with a corresponding receiving device via one of a variety of different communications mediums;
   a processor, in communication with the universal communications interface, wherein the processor is operable to:
   receive a utility signal;
   generate a status message based at least in part on the utility signal;
   identify a connected communication device, of the plurality of different types of communication devices, connected to the universal communications interface;
   format the status message into a format compatible with the connected communication device; and
   send the formatted status message to the connected communication device for subsequent transmission by the connected communication device.

2. The system of claim 1, wherein the processor comprises a utility meter processor.

3. The system of claim 1, wherein the utility signal comprises an analog wave form; and
   wherein the universal communications interface comprises an analog-to-digital converter operative to convert the analog wave form into a digital signal.

4. The system of claim 1, wherein the utility signal is received from a connect/disconnect monitor of a utility meter.

5. The system of claim 1, wherein the utility signal is received from a tamper detection monitor of a utility meter.

6. The system of claim 1, wherein the utility signal is received from a voltage monitor of a utility meter.

7. The system of claim 1, wherein the utility signal is received from a current monitor of a utility meter.

8. The system of claim 1, wherein the utility signal is received from an outage notification monitor of a utility meter.

9. The system of claim 1, further comprising a memory storage connected to the processor for storing computer-executable instructions executed by the processor; and
   wherein said computer-executable instructions cause the processor to determine whether the utility status signal exceeds a threshold value and, if so, to generate the status message.

10. The system of claim 9, wherein the memory storage further stores data relating to signal formats compatible with each of the plurality of different types of communication devices.

11. The system of claim 1, wherein the universal communications interface and processor reside within a utility meter.

12. The system of claim 1, wherein the universal communications interface is operable to interchangeably connect with each of the plurality of different types of communication devices.

13. A method of monitoring utility status, comprising:
    receiving a utility signal;
    generating a status message based at least in part on the utility signal;
    identifying a communication device, of a plurality of different types of communication devices each operative to communicate via a respective one of a variety of different communications mediums, wherein the communication device is connected to a universal communications interface configurable for communicating with each of the plurality of different types of communication devices;
    formatting the status message into a format compatible with the identified communication device; and
    sending the formatted status message to the identified communication device for subsequent transmission by the identified communication device.

14. The method of claim 13, wherein receiving a utility signal comprises receiving a utility signal at a processor.

15. The method of claim 14, wherein generating a status message comprises generating a status message, at the processor, based at least in part on the utility signal.

16. The method of claim 13, wherein sending the formatted status message comprises sending the formatted status message from the processor to the identified communication device for subsequent transmission by the identified communication device.

* * * * *